US012060008B2

(12) United States Patent
Sasaki et al.

(10) Patent No.: US 12,060,008 B2
(45) Date of Patent: Aug. 13, 2024

(54) MOVING BODY

(71) Applicant: TOYOTA JIDOSHA KABUSHIKI KAISHA, Toyota (JP)

(72) Inventors: Hidekazu Sasaki, Yokohama (JP); Daisuke Sato, Toyota (JP); Kazumi Serizawa, Toyota (JP); Shunsuke Mogi, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 17/861,778

(22) Filed: Jul. 11, 2022

(65) Prior Publication Data

US 2023/0035361 A1 Feb. 2, 2023

(30) Foreign Application Priority Data

Jul. 27, 2021 (JP) ................. 2021-122674

(51) Int. Cl.
*B60R 1/22* (2022.01)
*B60Q 1/50* (2006.01)

(52) U.S. Cl.
CPC ............... *B60R 1/22* (2022.01); *B60Q 1/545* (2022.05); *B60Q 2400/50* (2013.01); *B60R 2300/70* (2013.01); *B60R 2300/8093* (2013.01)

(58) Field of Classification Search
CPC ...... B60Q 1/5037; B60Q 1/543; B60Q 1/545; B60Q 2400/50; B60R 1/22; B60R 2300/70; B60R 2300/8093; G05D 1/0238
See application file for complete search history.

(56) References Cited

U.S. PATENT DOCUMENTS

| 2008/0175012 | A1 | 7/2008 | Shimaoka et al. |
| 2015/0336502 | A1* | 11/2015 | Hillis .................. G05D 1/0088 701/23 |
| 2017/0262715 | A1 | 9/2017 | Kozuka et al. |
| 2018/0029641 | A1* | 2/2018 | Solar .................... G01S 17/931 |
| 2019/0084585 | A1* | 3/2019 | Fritz .................... B60Q 1/0017 |
| 2022/0281381 | A1* | 9/2022 | Clochard ............... G08G 1/005 |

FOREIGN PATENT DOCUMENTS

| JP | 2008-143510 A | 6/2008 |
| JP | 2017-159881 A | 9/2017 |
| JP | 2020-070159 A | 5/2020 |
| JP | 2020-131897 A | 8/2020 |

* cited by examiner

*Primary Examiner* — Amy R Hsu

(74) *Attorney, Agent, or Firm* — Sughrue Mion, PLLC

(57) ABSTRACT

A moving body includes: a main body section provided with a moving mechanism; a peripheral information detection sensor configured to detect an obstacle peripheral to the main body section; and a control section configured to cause the main body section to autonomously travel by controlling the moving mechanism based on information regarding the peripheral obstacle detected by the peripheral information detection sensor, and configured to cause information relating to the peripheral obstacle, in a direction of progress of the main body section, to be displayed in a surrounding area of the main body section.

6 Claims, 4 Drawing Sheets

MOVING BODY

CROSS-REFERENCE TO RELATED APPLICATION

This application is based on and claims priority under 35 USC 119 from Japanese Patent Application No. 2021-122674 filed on Jul. 27, 2021, the disclosure of which is incorporated by reference herein.

BACKGROUND

Technical Field

The present disclosure relates to a moving body.

Related Art

Japanese Patent Application Laid-Open (JP-A) No. 2020-70159 discloses a delivery system including an autonomous traveling vehicle that autonomously travels toward a delivery destination, and a drone that is installed at the autonomous traveling vehicle and that delivers a package to the delivery destination after the autonomous traveling vehicle has arrived at a vicinity of the delivery destination.

However, in a configuration in which unmanned delivery is carried out by a moving body that autonomously travels, such as the delivery system described in Japanese Patent Application Laid-Open (JP-A) No. 2020-70159, there is room for improvement from the standpoint of eliminating anxiety due to not knowing whether the moving body has been able to detect persons at its surroundings.

SUMMARY

The present disclosure provides a moving body that is capable of eliminating anxiety of persons at its surroundings even during movement.

A first aspect of the present disclosure is a moving body including: a main body section provided with a moving mechanism; a peripheral information detection sensor configured to detect an obstacle peripheral to the main body section; and a control section configured to cause the main body section to autonomously travel by controlling the moving mechanism based on information regarding the peripheral obstacle detected by the peripheral information detection sensor, and configured to cause information relating to the peripheral obstacle, in a direction of progress of the main body section, to be displayed in a surrounding area of the main body section.

In the moving body of the first aspect, the main body section includes the moving mechanism, and due to the control section controlling the moving mechanism, the main body section autonomously travels. Further, the peripheral obstacle of the main body section is detected by the peripheral information detection sensor. The control section causes information relating to the peripheral obstacle in the direction of progress of the main body section to be displayed in a surrounding areas of the main body section. This enables the moving body to make persons at the surroundings of the moving body aware of information about the detected peripheral obstacle. It should be noted that "displayed at surroundings of the main body section" as used herein is not limited to a configuration in which display is carried out on an outer surface of the main body section, and is a concept that broadly encompasses a configuration in which projection onto a road surface at surroundings of the main body section is carried out. Further, "peripheral obstacle" as used herein is a concept that broadly encompasses objects that can obstruct the progression of the moving body, and includes persons, animals, vehicles, and the like.

In a second aspect of the present disclosure, in the first aspect, the control section may be configured to cause a relative position of the peripheral obstacle with respect to the main body section to be displayed.

In the moving body of the second aspect, the relative position of the peripheral obstacle with respect to the main body section (the moving body) is displayed, enabling persons at the surroundings to be made aware of the positional relationship with the moving body.

In a third aspect of the present disclosure, in the second aspect, the control section may be configured to change a display mode in accordance with a distance between the main body section and the peripheral obstacle.

In the moving body of the third aspect, by changing the display mode for a person inadvertently approaching the moving body, a person at the periphery can be made aware that they are approaching the moving body.

In a fourth aspect of the present disclosure, in the first aspect, the peripheral information detection sensor may include a camera that is configured to capture an image in the direction of progress, and the control section may be configured to cause an image of the peripheral obstacle captured by the camera to be displayed.

In the moving body of the fourth aspect, by displaying the image of the peripheral obstacle, persons at the surroundings can grasp an object that the moving body has recognized.

In a fifth aspect of the present disclosure, in any one of the first aspect to the fourth aspect, the control section may be configured to cause information relating to the peripheral obstacle to be displayed by a projection device that projects an image onto a road surface in the surrounding area of the main body section.

In the moving body of the fifth aspect, since the information relating to the peripheral obstacle is projected onto the road surface by the projection device, the display area does not depend on a size of the moving body. This enables a wide display area to be secured even if the moving body is relatively small, as compared with a configuration in which display is carried out directly on an outer surface of the moving body.

In a sixth aspect of the present disclosure, in any one of the first aspect to the fifth aspect, the control section may be configured to cause a planned movement direction to be displayed.

In the moving body of the sixth aspect, by displaying the planned movement direction, persons at the surroundings can be made to grasp the movement direction of the moving body in advance.

As described above, the moving body according to the present disclosure can eliminate anxiety of persons at its surroundings even during movement.

BRIEF DESCRIPTION OF THE DRAWINGS

An exemplary embodiment of the present disclosure will be described in detail based on the following figures, wherein.

DETAILED DESCRIPTION

Figure 1:
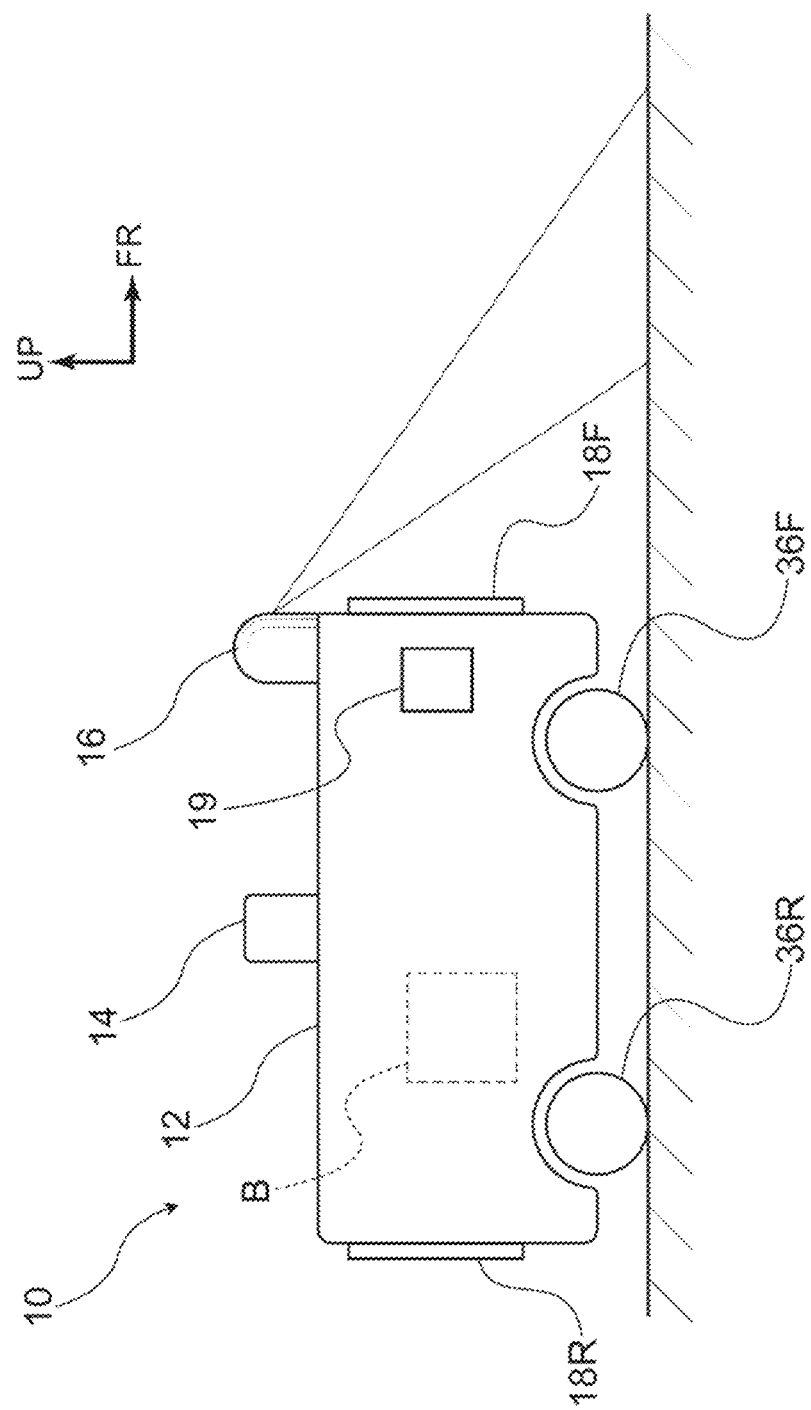
FIG. 1 is a schematic side view in which a moving body according to an exemplary embodiment is seen from the side.

Below, a moving body 10 according to an exemplary embodiment of the present disclosure will be explained with reference to the drawings. As illustrated in FIG. 1, the moving body 10 of the present exemplary embodiment includes a substantially rectangular parallelepiped-shaped main body section 12. It should be noted that the arrow FR and the arrow UP illustrated in FIG. 1 respectively indicate a progression direction (forward direction) of the moving body 10 and an upward direction of the moving body 10.

The main body section 12 is formed in a substantially rectangular shape in a side view, and a cargo compartment in which a package B is accommodated is secured at an interior of the main body section 12. In this regard, the moving body 10 of the present exemplary embodiment is configured as a delivery robot that carries out delivery of packages, as one example. It should be noted that, although FIG. 1 illustrates a state in which a single package B is accommodated, there is no limitation thereto, and a configuration may be adopted in which plural packages B can be accommodated.

A peripheral information detection sensor 14 that detects peripheral obstacles that are obstacles at a periphery of the moving body 10 is provided at an upper portion of the main body section 12. The peripheral information detection sensor 14 of the present exemplary embodiment is configured including, as one example, sensors such as LIDAR (Light Detection and Ranging or Laser Imaging Detection and Ranging) or the like. Further, aside from this, an engineering camera, radar, and the like may be provided as the peripheral information detection sensor 14.

A projection device 16 is provided at an upper portion and a front portion of the main body section 12. The projection device 16 is a device that projects a predetermined image toward a road surface at surroundings of the moving body 10, and, in the present exemplary embodiment, the projection device 16 is configured so as to project an image onto a road surface ahead of the moving body 10, as one example. Further, the image projected onto the road surface by the projection device 16 relates to information relating to peripheral obstacles of the moving body 10 that have been detected by the peripheral information detection sensor 14.

A front display panel 18F is provided at a front surface of the main body section 12, and a rear display panel 18R is provided at a rear surface of the main body section 12. Various information is displayed on each of the front display panel 18F and the rear display panel 18R. In the present exemplary embodiment, as one example, images of peripheral obstacles of the moving body 10 are displayed on the front display panel 18F and the rear display panel 18R. For example, the face of a person walking at the periphery of the moving body 10 is displayed on the front display panel 18F and the rear display panel 18R.

Hardware Configuration of the Moving Body 10

Figure 2:
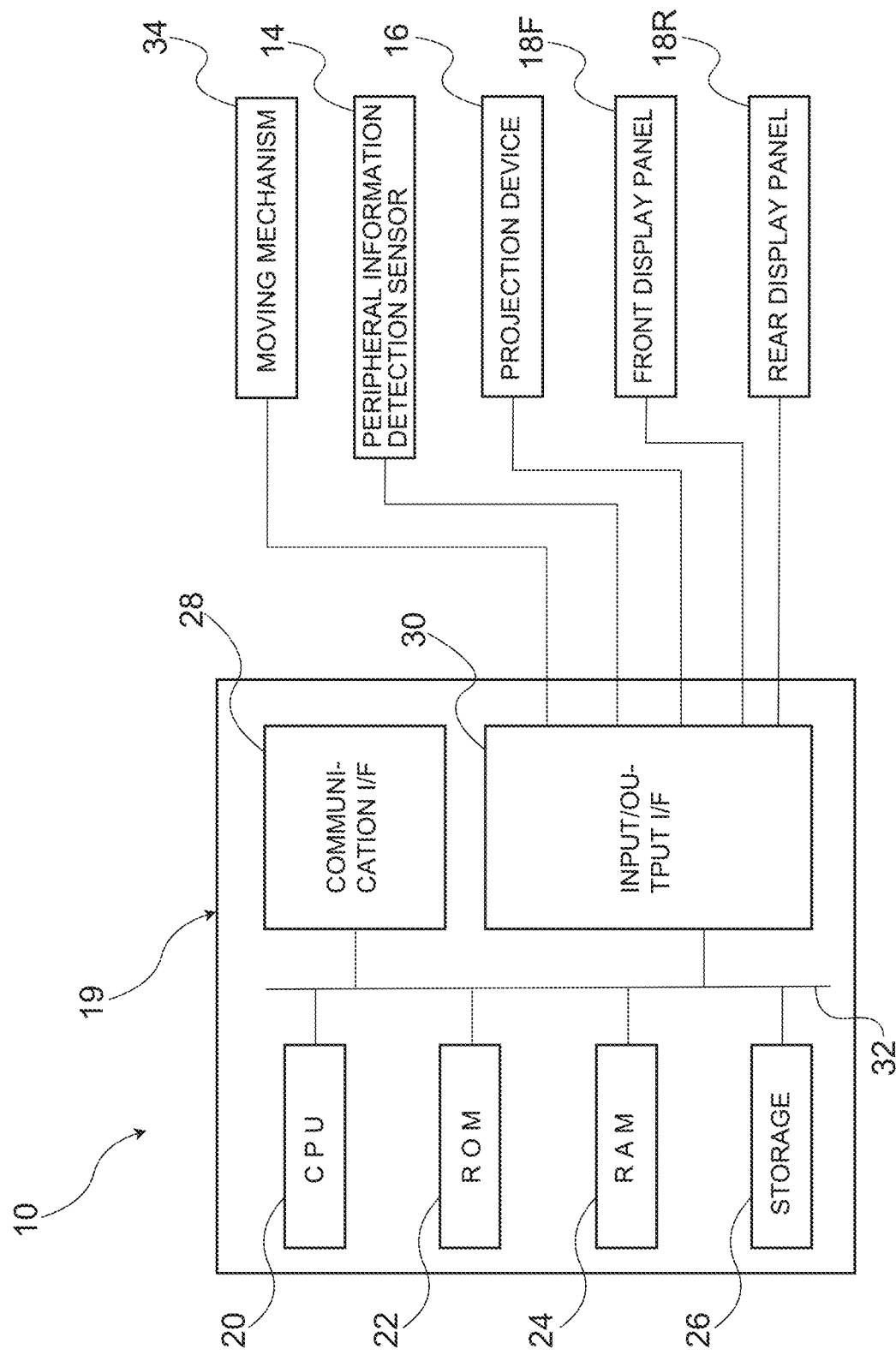
FIG. 2 is a block diagram illustrating a hardware configuration of a moving body according to an exemplary embodiment.

The moving body 10 is provided with a control section 19. As illustrated in FIG. 2, the control section 19 configuring the moving body 10 is configured including a central processing unit (CPU; serving as a processor) 20, a read only memory (ROM) 22, a random access memory (RAM) 24, a storage 26, a communication interface (communication I/F) 28, and an input/output interface (input/output I/F) 30. These configurations are connected via an internal bus 32 so as to be capable of communicating with each other.

The CPU 20 is a central arithmetic processing unit that executes various programs and controls various sections. Namely, the CPU 20 reads a program from the ROM 22 or the storage 26, and executes the program using the RAM 24 as a workspace. The CPU 20 carries out control of the aforementioned respective configurations and various arithmetic processing according to the program recorded in the ROM 22 or the storage 26.

The ROM 22 stores various programs and various data. The RAM 24 serves as a workspace to temporarily store a program or data. The storage 26 is configured by a hard disk drive (HDD) or a solid state drive (SSD), and stores various programs including an operating system, as well as various data.

The communication I/F 28 is an interface used by the moving body 10 to communicate with the main body section 12 and other devices, and, for example, employs a standard such as a controller area network (CAN), Ethernet (registered trademark), long term evolution (LTE), a fiber distributed data interface (FDDI), Wi-Fi (registered trademark) or the like.

The input/output I/F 30 is electrically connected to the moving mechanism 34, the peripheral information detection sensor 14, the projection device 16, the front display panel 18F, and the rear display panel 18R.

The moving mechanism 34 is a mechanism for causing the main body section 12 to autonomously travel, and is configured including a pair of front wheels 36F, a pair of rear wheels 36R, a non-illustrated motor that transmits driving force to the front wheels 36F and the rear wheels 36R, and a non-illustrated steering angle control device that changes steering angles of the front wheels 36F and the rear wheels 36R.

Further, autonomous traveling of the moving body 10 of the present exemplary embodiment is controlled by the control section 19. More specifically, the control section 19 generates a travel plan based on peripheral information detected by the peripheral information detection sensor 14 and map information acquired from a server, and carries out autonomous traveling by controlling the moving mechanism 34 so as to move the moving body 10 according to the generated travel plan.

The control section 19 controls the projection device 16 so as to display, at the surroundings of the main body section, information relating to peripheral obstacles at least in the progression direction of the moving body 10 including the main body section 12.

Figure 3:
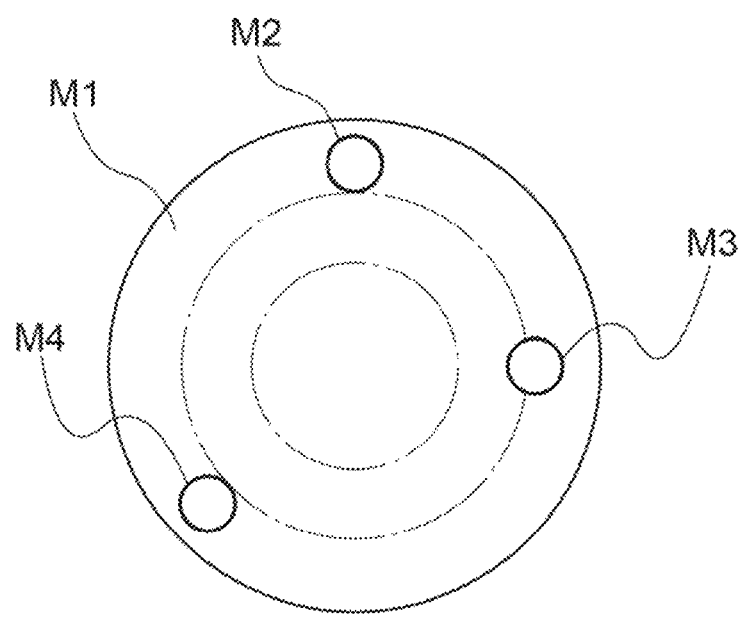
FIG. 3 is a diagram illustrating an example of a display projected onto a road surface by a moving body according to an exemplary embodiment.

Next, an example of an image that the control section 19 causes to be projected onto a road surface by the projection device 16 will be explained. FIG. 3 illustrates an example of an image projected onto the road surface by the projection device 16. As illustrated in FIG. 3, the control section 19 causes a substantially circular image M1 to be displayed by the projection device 16. The image M1 includes an outermost circular portion and two concentric circles displayed more lightly than the circular portion.

Further, substantially circular images M2, M3, and M4 that are smaller than the image M1 are displayed by the projection device 16. The images M2, M3, and M4 respectively indicate peripheral obstacles of the moving body 10. More specifically, a center of the image M1 corresponds to a position of the moving body 10, and relative positions of the peripheral obstacles with respect to the position of the moving body 10 are indicated by the images M2, M3, and M4.

As one example, an upward direction in the drawing in which the image M2 is present coincides with a progression direction (forward direction) of the moving body 10. As a result, the peripheral obstacle corresponding to the image M2 is positioned ahead of the moving body 10. Further, the peripheral obstacle corresponding to the image M3 is positioned on the right side of the moving body 10. Moreover, the peripheral obstacle corresponding to the image M4 is positioned toward the left and rear of the moving body 10. In this manner, in the present exemplary embodiment, the control section 19 causes the relative positions of the peripheral obstacles with respect to the main body section 12 of the moving body 10 to be displayed by the projection device 16.

Figure 4:
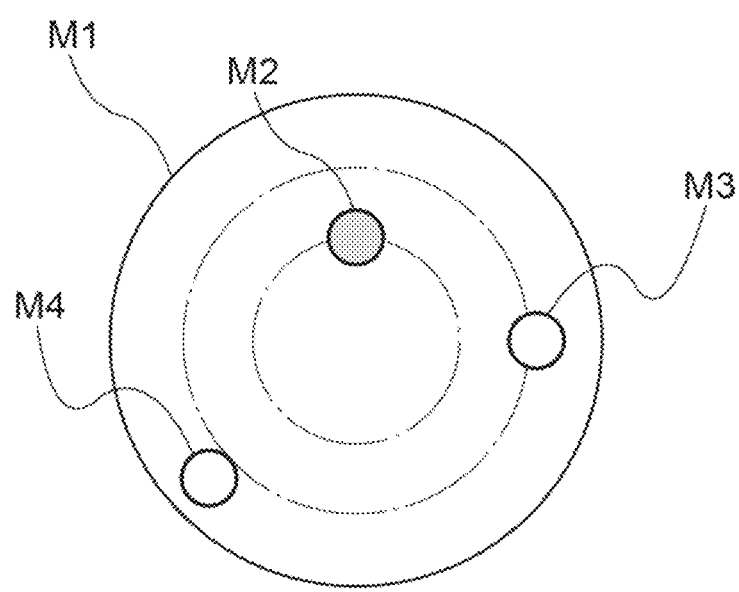
FIG. 4 is a diagram illustrating an example of a display projected onto a road surface by a moving body according to an exemplary embodiment.

Further, the control section 19 changes display modes of the images M2, M3, and M4 according to distances between the moving body 10 and the peripheral obstacles. More specifically, as illustrated in FIG. 4, in a case in which a distance between the peripheral obstacle corresponding to the image M2 and the moving body 10 becomes less than a predetermined distance, the control section 19 carries out display by changing a color of the image M2. More specifically, the control section 19 is configured so as to change the color of the image M2 corresponding to the peripheral obstacle that has come closer to the center (moving body 10) of the image M1 than the innermost circle of the image M1.

Figure 5:
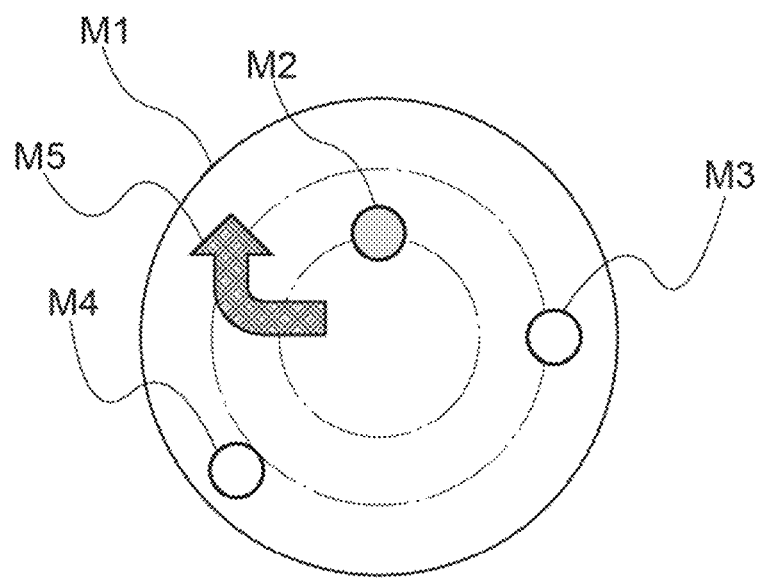
FIG. 5 is a diagram illustrating an example of a display projected onto a road surface by a moving body according to an exemplary embodiment.

Moreover, in the present exemplary embodiment, the control section 19 causes a planned movement direction of the main body section 12 to be projected onto the road surface by the projection device 16. More specifically, as illustrated in FIG. 5, an image M5 simulating an arrow is projected onto the road surface.

The image M5 displays the planned movement direction superimposed on the image M1 when the moving body 10 changes course. The example of display in FIG. 5 is an example of a display at a time when the moving body 10 changes course in order to avoid a peripheral obstacle because the peripheral obstacle corresponding to the image M2 is present in the progression direction.

Operation

Next, operation of the present exemplary embodiment will be explained.

In the moving body 10 according to the present exemplary embodiment, as illustrated in FIG. 1 and FIG. 2, the main body section 12 includes the moving mechanism 34, and, due to the control section 19 controlling the moving mechanism 34, the main body section 12 autonomously travels. Further, the peripheral obstacles of the main body section 12 are detected by the peripheral information detection sensor 14.

The control section 19 causes information relating to peripheral obstacles at least in the progression direction of the main body section 12 to be displayed at the surroundings of the main body section 12. This enables the moving body 10 to make persons at the surroundings of the moving body 10 aware of information about the detected peripheral obstacles.

Further, as illustrated in FIG. 3 and FIG. 4, in the present exemplary embodiment, the relative positions of the peripheral obstacles with respect to the main body section 12 are displayed by the projection device 16 on the road surface as the image M2, the image M3, and the image M4, enabling persons at the surroundings to be made aware of the positional relationships with the moving body 10.

Moreover, since the information relating to the peripheral obstacles is projected onto the road surface by the projection device 16, the display area does not depend on a size of the moving body 10. This enables a wide display area to be secured even if the moving body 10 is relatively small.

Furthermore, by changing display colors (display modes) of the image M2, the image M3, and the image M4 for a person inadvertently approaching the moving body 10, a person at the periphery can be made aware that they are approaching the moving body.

Further, as illustrated in FIG. 5, in the present exemplary embodiment, by displaying the planned movement direction of the main body section 12 (the moving body 10) as the image M5, persons at the surroundings can be made to grasp the movement direction of the moving body 10 in advance.

Furthermore, in the present exemplary embodiment, by displaying images of the peripheral obstacles on the front display panel 18F and the rear display panel 18R, persons at the surroundings can grasp the objects that the moving body 10 has recognized.

Figure 6:
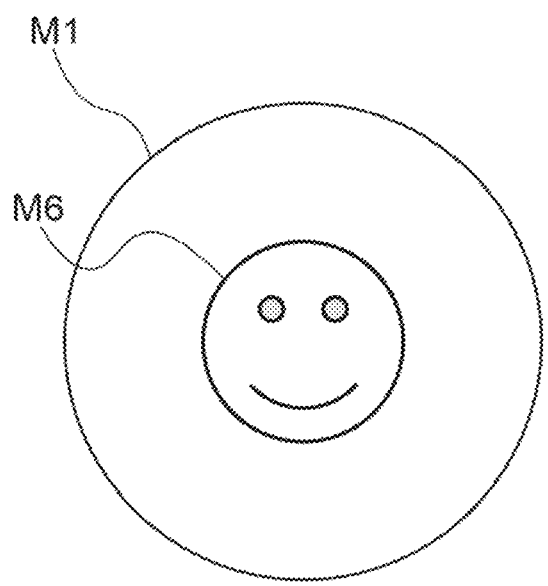
FIG. 6 is a diagram illustrating an example of a display in a modified example.

It should be noted that, in the present exemplary embodiment, the configuration of the modified example illustrated in FIG. 6 may be adopted as an image projected by the projection device 16.

Modified Examples

As illustrated in FIG. 6, in the present modified example, the image M1 and an image M6 are projected onto the road surface by the projection device 16. The image M6 is an image of a peripheral obstacle captured by a camera that captures an image of the progression direction of the moving body 10. More specifically, the control section 19 projects a face of a person in the progression direction of the moving body 10 onto the road surface as the image M6.

Further, in a case in which persons serving as plural peripheral obstacles are detected in the progression direction of the moving body 10, the control section 19 causes a face of a person that is closest to the moving body 10 to be projected onto the road surface as the image M6.

In the present modified example, by projecting a face of a person detected by the moving body 10 onto the road surface as the image M6, a person at the surroundings of the moving body 10 can be made to grasp that the moving body 10 has recognized the face of the person.

Although explanation has been provided above regarding the moving body 10 according to the exemplary embodiments, it is obvious that a variety of aspects may be implemented within a range that does not depart from the gist of the present disclosure. In the aforementioned exemplary embodiments, although the information relating to the peripheral obstacles is displayed on the road surface by the projection device 16 as illustrated in FIG. 1, there is no limitation thereto. For example, a configuration that does not include the projection device 16 may be adopted. In this case, the information relating to the peripheral obstacles may be displayed on the front display panel 18F and the rear display panel 18R. Furthermore, display panels may also be disposed on side surfaces of the main body section 12, and images of peripheral obstacles facing the respective display panels or the like may be displayed on the respective display panels.

Further, in the aforementioned exemplary embodiments, although display is carried out by changing the color of the image M2 of the peripheral obstacle that has approached the moving body 10 as illustrated in FIG. 4, there is no limitation thereto. For example, an image corresponding to a peripheral obstacle that has approached the moving body 10 may be caused to flash. Moreover, in the aforementioned exemplary embodiments, although the peripheral obstacles are displayed with substantially circular images, there is no limitation thereto, and the shapes of the images may be modified as appropriate. For example, the shapes of the images may be changed according to the types of the peripheral obstacles. Namely, in a case in which a peripheral obstacle detected by the peripheral information detection sensor 14 is a vehicle, an image having a shape simulating a vehicle may be displayed.

Moreover, in a case in which a recipient of the package B that the moving body 10 is delivering is nearby, an image corresponding to the recipient may be displayed in a different color from other peripheral obstacles. For example, in a case in which the moving body 10 receives a signal transmitted from a portable terminal of the recipient to thereby authenticate that they are the recipient of the package B, the color of the image corresponding to the recipient is changed. This enables the moving body 10 that is delivering the package B to be quickly grasped even in a case in which plural moving bodies are traveling at the surroundings of the recipient.

What is claimed is:

1. A moving body configured as a delivery robot for delivering packages, comprising:
   a main body section of the delivery robot provided with a moving mechanism;
   a front display panel provided at a front surface of the main body section;
   a rear display panel provided at a rear surface of the main body section;
   a peripheral information detection sensor configured to detect an obstacle peripheral to the main body section;
   a projection device that projects information relating to the peripheral obstacle onto a road surface in a direction of progress of the delivery robot; and
   a control section, including at least one processor, configured to:
   cause the main body section to autonomously travel by controlling the moving mechanism based on information regarding the peripheral obstacle detected by the peripheral information detection sensor,
   cause the projection device to display an image onto the road surface so as to make a person in the surrounding area of the delivery robot aware of the information relating to the peripheral obstacle, and
   based upon the peripheral obstacle being a person, display a facial image of the person on the front display panel and the rear display panel.

2. The moving body according to claim 1, wherein the control section is configured to cause a relative position of the peripheral obstacle with respect to the main body section to be displayed in the image on the road surface.

3. The moving body according to claim 2, wherein the control section is configured to change a display mode of the projection device in accordance with a distance between the main body section and the peripheral obstacle.

4. The moving body according to claim 1, wherein:
   the peripheral information detection sensor includes a camera that is configured to capture an image of the peripheral obstacle in the direction of progress, and
   the control section is configured to cause the projection device to display the image of the peripheral obstacle captured by the camera on the road surface.

5. The moving body according to claim 1, wherein the control section is configured to cause the projection device to display a planned movement direction on the road surface.

6. The moving body according to claim 3, wherein the control section is configured to cause the projection device to change a color of the image in a case in which a distance between the main body section and the peripheral obstacle has become less than a predetermined distance.

* * * * *